Nov. 30, 1948.  N. LEVIN  2,455,309
METHOD OF SOLDERING BOURDON TUBES AND THE LIKE
Filed Sept. 6, 1945
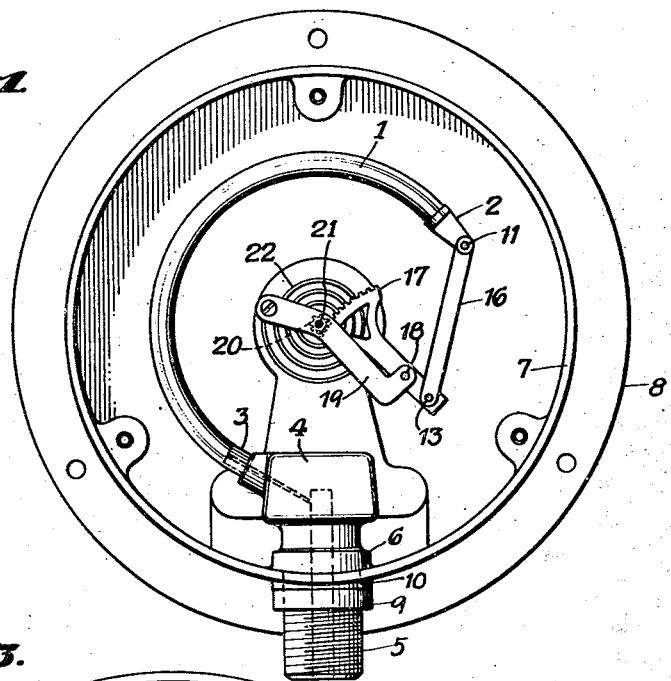
Fig.1
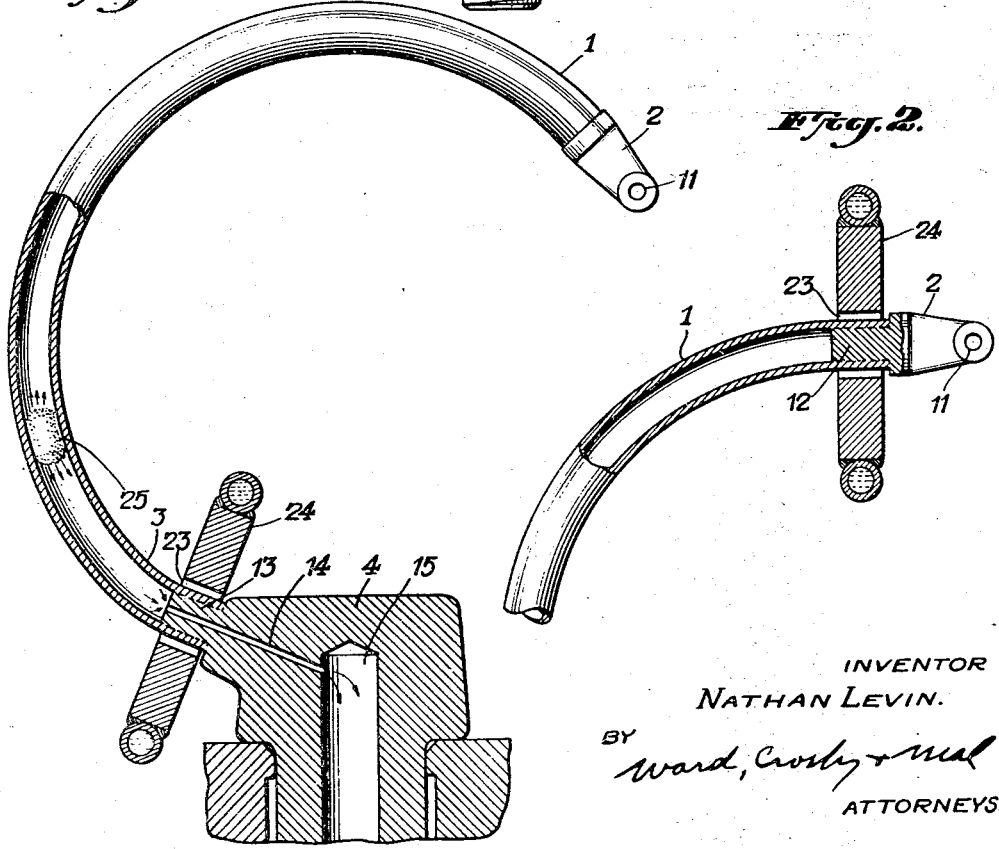
Fig.3
Fig.2
INVENTOR
NATHAN LEVIN.
BY Ward, Crosby + Neal
ATTORNEYS.

Patented Nov. 30, 1948

2,455,309

UNITED STATES PATENT OFFICE 2,455,309

METHOD OF SOLDERING BOURDON TUBES AND THE LIKE

Nathan Levin, Brooklyn, N. Y., assignor to Induction Heating Corp., New York, N. Y., a corporation of New York Application September 6, 1945, Serial No. 614,734

4 Claims. (Cl. 113—112)

This invention pertains to new and improved methods of soldering or brazing Bourdon tubes, or similar components, where it is necessary to prevent the solder from constricting or closing small orifices during the brazing or soldering operation.

For example, in the manufacture of Bourdon tubes for gauges, it is necessary, under the present practice, first to braze the tube to the base block, during which operation air is forced through the tube and the block to prevent the solder from constricting or obstructing the orifice during the soldering operation. The next operation is to braze or solder the bridge to the opposite end of the tube and, as this operation is the final one, it is then necessary very accurately to align the bridge in respect to the brazing or soldering, in order that the resulting assembly, when mounted on the casing and coupled to the requisite indicating mechanism, will provide proper and accurate indication. The entire procedure thus employed at present is difficult in that very accurate alignment must be maintained throughout.

In accordance with the present invention, a new and simplified procedure, which minimizes alignment difficulties, is employed as follows: The first step consists in brazing or soldering the bridge to the Bourdon tube. Accurate alignment is not now necessary. Next, the opposite end of the tube, which is to be brazed or soldered to the base block, is first dipped into Dry Ice, i. e., solidified carbon dioxide, thereby forcing a quantity of the Dry Ice into the tube for a short distance. This end of the tube is now placed on the base block and soldered or brazed thereto. Owing to the presence of the Dry Ice within the tube, carbon dioxide gas will be rapidly released, thereby keeping the orifice clear during the soldering or brazing operation. Thus, with the present proposed procedure, the only alignment necessary is the single alignment of the Bourdon tube with respect to the base block.

Referring now to the drawing for a more detailed explanation of the brazing or soldering procedure in accordance with the present invention:

Fig. 1 is a view in rear elevation, with the back cover removed, of a single spring Bourdon gauge;

Fig. 2 is a fragmentary showing in longitudinal sectional elevation of the portion of the Bourdon tube to which the bridge is secured, together with the bridge and associated induction heating element employed during the brazing operation for securing the bridge to the tube; while Fig. 3 is a view in partial longitudinal sectional elevation of the Bourdon tube with the bridge secured to one end, the opposite end being shown in process of soldering or brazing the same to the base block, including a showing of the Dry Ice within the tube and the surrounding induction heating element.

Referring to Fig. 1, the assembled Bourdon tube gauge, as viewed from the rear with the back cover removed, comprises, for purposes of identification of parts in describing the present invention, the usual semi-circular sector of Bourdon tubing 1, to one end of which the bridge 2 is soldered or brazed, the opposite end of the tube 1 being in turn soldered or brazed, as at 3, to the base block 4. The base block is provided with the usual externally threaded inlet extension 5 terminating in a shoulder 6 for mounting the above assembly in an aperture of a flanged extension 7 of a casing 8 housing the unit, the unit being firmly secured in place by means of a sleeve 9 and interposed washer 10, threaded into extension 5.

Referring to Fig. 2, the bridge 2 terminate at one end in an eyelet 11 and at its opposite end in a stud 12 which fits into and closes, in a brazed or soldered joint, one end of the Bourdon tube 1. Referring to Fig. 3, the base block 4 is provided with an extension stud which fits into the opposite end 3 of tube 1 and engages the same in a soldered joint. For applying pressure from a source to be measured to the interior of the Bourdon tube 1, the base block 4 is drilled with communicating passages 14, 15, one of which 14 opens into the Bourdon tube 1, while the other 15 opens through the threaded base block extension 5, to which the pressure to be measured is conveyed by means of pipe extensions, etc., threaded thereto.

Reverting to Fig. 1, movements of the free or bridge end 2 of the Bourdon tube resulting from pressure variations therein, are translated into proportional angular deflections of a pointer traversing a dial on the opposite side of the casing 8, and not shown, by means of a link member 16 pivoted at one end to the bridge eyelet 11', and at its opposite end to a ratchet member 17, pivoted at 18 to a fixed support 19, the ratchet in turn engaging a pinion 20 keyed to the pointer shaft 21. Also, a spiral restoring spring 22 is secured, at its opposite ends, between shaft 21 and the fixed support 19.

With the above constructional details in mind, the improved process of the present invention for soldering or brazing the bridge 2 and base block 4 to the Bourdon tube 1 is carried out in the following steps.

The bridge 2 is first soldered to tube 1 by thrusting one end of the tube 1 through the orifice 23 of an annular induction heating unit 24, Fig. 2. A ring of solder is placed about the extension stud 12 of the bridge 2, and the stud 12 inserted in tube 1, the induction heating unit 24 being energized to melt the solder and solder the joint, whereupon the heating unit 24 is removed. As stated, accurate alignment of the bridge 2, with respect to tube 1, is not required in this operation.

With the bridge 2 thus secured to tube 1, the opposite or open end 3 of the tube is now thrust into Dry Ice until a quantity 25 thereof is forced into the interior of the tube, and the tube thereupon tilted back and tapped to shake the Dry Ice well away from the orifice, as shown in the drawing, in order to avoid a cooling effect during the subsequent soldering operation. The end 3 of tube 1 is thereupon inserted in the orifice 23 of the induction heating unit 24; a ring of solder is placed about extension stud 13 of the base block 4, and the stud inserted in the end 3 of the tube, during which interval the induction heating unit 24 is energized to melt the solder and solder the joint. While soldering is thus being effected, carbon dioxide gas will be rapidly evolved from the Dry Ice, and, owing to closure of the opposite end of tube 1 by the bridge 2, will forcibly escape through passageways 14, 15 in the base block, thereby maintaining these passages free and clear of solder during soldering, so that there will be no restriction or obstruction thereof as a result of the soldering operation. As above stated, it is only during this step in the process that accurate alignment is required between the Bourdon tube and the element soldered thereto, namely, the base block.

In the appended claims, the expression "soldering" is understood to include brazing.

I claim:

1. Method of soldering together a pair of objects having small orifices in such manner as to form a continuous unobstructed passageway therebetween, which comprises: disposing in a compartment completely enclosing one end of one said orifice, a solidified, non-inflammable material which rapidly vaporizes at atmospheric temperatures, and permitting said material to vaporize and escape from said compartment through said orifices and passageway while carrying out said soldering operation.

2. Method of soldering together a pair of objects having small orifices therein in such manner as to provide a continuous unobstructed passageway through said orifices therebetween, which comprises: disposing in a compartment completely enclosing one end of one said orifice, a quantity of solidified carbon dioxide, and permitting said carbon dioxide to vaporize and escape from said compartment through said orifices and passageway while carrying out said soldering operation.

3. In the manufacture of Bourdon gauges and the like, the method of forming the Bourdon tube integral with the bridge and apertured base block thereof, which comprises the successive steps of: soldering the bridge to one end of said tube thereby to plug said end, placing within the opposite end of the tube a solidified, non-inflammable material which rapidly vaporizes at atmospheric temperatures, and soldering the base block to the said opposite end of said tube while permitting said material to vaporize and escape through the said base block aperture, thereby to prevent obstruction thereof by the soldering material.

4. In the manufacture of Bourdon gauges and the like, the method of forming the Bourdon tube integral with the bridge and apertured base block thereof, which comprises the successive steps of: soldering the bridge to one end of said tube thereby to plug said end, placing within the opposite end of the tube a quantity of solidified carbon dioxide, and soldering the base block to the said opposite end of said tube while permitting said carbon dioxide to vaporize and escape through said base block aperture, thereby to prevent obstruction thereof by the soldering material.

NATHAN LEVIN.

REFERENCES CITED

The following references are of record in the file of this patent:

UNITED STATES PATENTS

| Number | Name | Date |
|---|---|---|
| 1,700,242 | Sieper | Jan. 29, 1929 |
| 1,970,715 | Tate | Aug. 21, 1934 |
| 2,070,368 | Martin | Feb. 9, 1937 |
| 2,085,313 | Guthrie | June 29, 1937 |
| 2,248,801 | Bernt | July 8, 1941 |